United States Patent
Sakamoto

(10) Patent No.: US 10,644,857 B2
(45) Date of Patent: May 5, 2020

(54) METHOD AND APPARATUS FOR REFERENCE SIGNAL CONFIGURATION OF A WIRELESS COMMUNICATION SYSTEM

(71) Applicant: HON HAI PRECISION INDUSTRY CO., LTD., New Taipei (TW)

(72) Inventor: Mitsuo Sakamoto, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/192,815

(22) Filed: Nov. 16, 2018

(65) Prior Publication Data

US 2019/0158248 A1    May 23, 2019

Related U.S. Application Data

(60) Provisional application No. 62/587,675, filed on Nov. 17, 2017.

(51) Int. Cl.
*H04L 5/00* (2006.01)
*H04L 1/00* (2006.01)

(52) U.S. Cl.
CPC .......... *H04L 5/0051* (2013.01); *H04L 1/0003* (2013.01); *H04L 1/0009* (2013.01)

(58) Field of Classification Search
CPC ... H04L 5/0051; H04L 1/0003; H04L 1/0009; H04L 5/0048; H04L 5/0053; H04B 7/2121; H04B 7/2123; H04J 2203/0069; H04Q 2213/394; H04W 72/04; H04W 72/12; H04W 76/00

See application file for complete search history.

(56) References Cited

U.S. PATENT DOCUMENTS

| | | | |
|---|---|---|---|
| 9,253,771 B2* | 2/2016 | Miao | H04W 72/042 |
| 9,258,095 B2* | 2/2016 | Zhang | H04L 5/003 |
| 2016/0182203 A1* | 6/2016 | Fang | H04L 5/0048 370/329 |
| 2016/0315748 A1* | 10/2016 | Chen | H04L 5/0051 |

\* cited by examiner

*Primary Examiner* — Sharad Rampuria
(74) *Attorney, Agent, or Firm* — ScienBiziP, P.C.

(57) ABSTRACT

A method for reference signal configuration includes: receiving, by a base station, a plurality of uplink sequences from an uplink channel; performing, by the base station, an optimal combining procedure on the plurality of uplink sequences to output a combined result of the plurality of uplink sequences; determining, by the base station, channel signature information based on the combined result; detecting, by the base station, a plurality of complex signals at peak positions from the plurality of uplink sequences based on the channel signature information; estimating, by the base station, a correlation level based on the plurality of complex signals; and determining a density of the reference signal and MCS based on the correlation level.

18 Claims, 11 Drawing Sheets

METHOD AND APPARATUS FOR REFERENCE SIGNAL CONFIGURATION OF A WIRELESS COMMUNICATION SYSTEM

CROSS REFERENCE

This application claims the benefit and priority to of U.S. Provisional Application Ser. No. 62/587,675, filed on Nov. 17, 2017, and entitled "PT-RS and MCS determination scheme," (hereinafter referred to as "US72317 application"). The disclosure of the US72317 application is hereby incorporated fully by reference into the present application.

FIELD

The present disclosure generally relates to a method and apparatus for reference signal configuration of a wireless communication system.

BACKGROUND

The fifth generation (5G) new radio (NR) wireless communication system supports a wide range of spectrum, from below 1 GHz to more than 30 GHz (e.g., millimeter wave). The system must use a variety of radio frequency components in order to support the wide range spectrum and the characteristics of the components are different from each other. In addition, the 5G NR wireless communication system has to support same mobility with 4G, which is up to 500 km/h. As the maximum Doppler frequency becomes higher when millimeter wave is used, it is very difficult to support all deployment scenarios with only one frame format. Adaptive reference signal configuration may be implemented in order to support the wide range of mobility in millimeter wave frequency range proposed in the 5G NR wireless communication system.

SUMMARY

The present disclosure is directed to a method and apparatus for reference signal configuration of a wireless communication system.

In one aspect of the present disclosure, a method for reference signal configuration of a wireless communication system is provided. The method includes receiving, by a base station, a plurality of uplink sequences from an uplink channel; performing, by the base station, an optimal combining procedure on the plurality of uplink sequences to output a combined result of the plurality of uplink sequences; determining, by the base station, channel signature information based on the combined result; detecting, by the base station, a plurality of complex signals at peak positions from the plurality of uplink sequences based on the channel signature information; estimating, by the base station, a correlation level based on the plurality of complex signals; and determining a density of a reference signal and the MCS based on the correlation level.

In another aspect of the present disclosure, a base station is provided. The base station includes one or more non-transitory computer-readable media having computer-executable instructions embodied thereon; and at least one processor coupled to the one or more non-transitory computer-readable media, and configured to execute the computer-executable instructions to: receive a plurality of uplink sequences from an uplink channel; perform an optimal combining procedure on the plurality of uplink sequences to output a combined result of the plurality of uplink sequences; determine channel signature information based on the combined result; detect a plurality of complex signals at peak positions from the plurality of uplink sequences based on the channel signature information; estimate a correlation level based on the plurality of complex signals; and determine a density of a reference signal and the MCS based on the correlation level.

DETAILED DESCRIPTION

Figure 1:
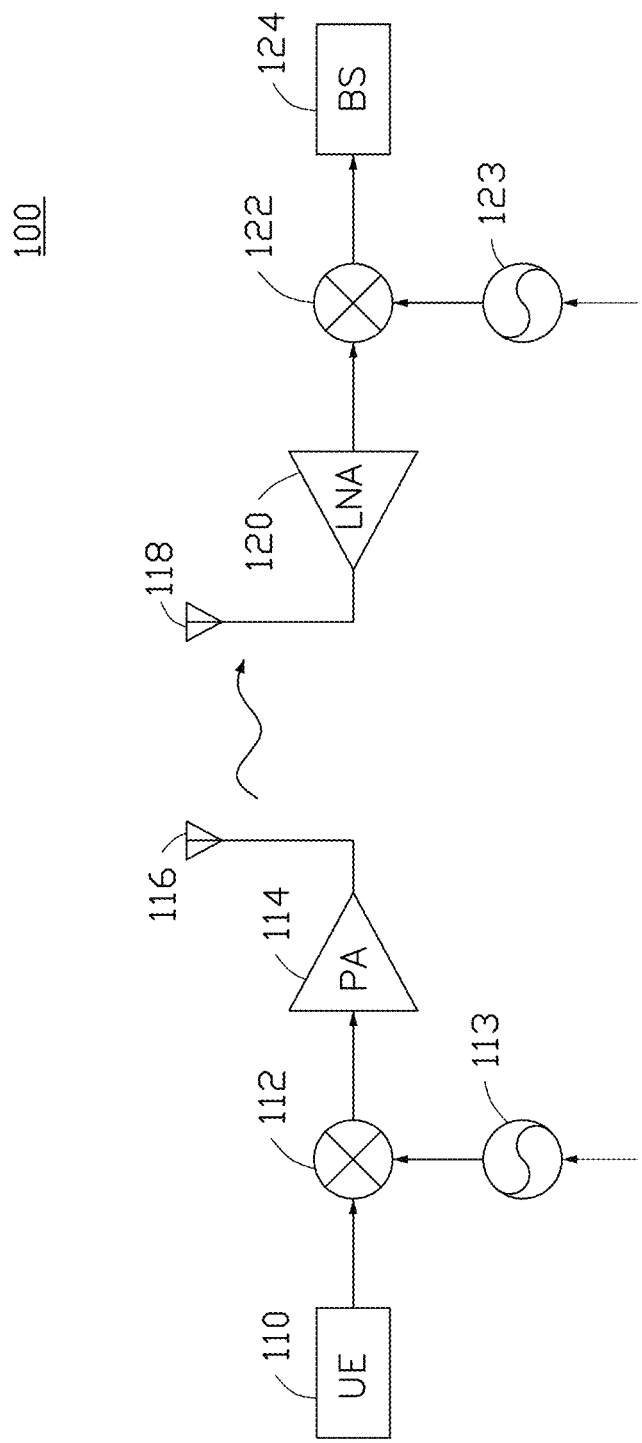
FIG. 1 is a schematic diagram of a radio transmission model of a wireless communication system according to an exemplary implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

Several definitions that apply throughout the present disclosure will now be presented. The term "coupled" is defined as connected, whether directly or indirectly through intervening components, and is not necessarily limited to physical connections. The connection can be such that the objects are permanently connected or releasably connected.

In the present disclosure, a base station may include, but is not limited to, a node B (NB) as in the Universal Mobile Telecommunication System (UMTS), as in the LTE-A, a radio network controller (RNC) as in the UMTS, a base station controller (BSC) as in the GSM (Global System for Mobile Communication)/GERAN (GSM EDGE Radio Access Network), a ng-eNB as in an Evolved Universal Terrestrial Radio Access (E-UTRA) base station in connection with the 5G Core Network (5GC), a next generation node B (gNB) as in the 5G Access Network (5G-AN), an RRH (Remote Radio Head), a TRP (transmission and reception point), a cell, and any other apparatus capable of controlling radio communication and managing radio resources within a cell. The base station may connect to serve one or more UE(s) through a radio interface to the network.

In the present disclosure, a UE may include, but is not limited to, a mobile station, a mobile terminal or device, and a user communication radio terminal. For example, a UE may be a portable radio equipment, which includes, but is not limited to, a mobile phone, a tablet, a wearable device, a sensor, a personal digital assistant (PDA) with wireless communication capability, and other wireless devices equipping with an LTE access module or an 5G NR (New Radio) access module. In the present disclosure, the UE is configured to communicate with a radio access network via the base station.

The UE or the base station may include, but is not limited to, a transceiver, a processor, a memory, and a variety of computer-readable media. The transceiver having transmitter and receiver configured to transmit and/or receive data. The processor may process data and instructions. The processor may include an intelligent hardware device, e.g., a central processing unit (CPU), a microcontroller, an ASIC. The memory may store computer-readable, computer-executable instructions (e.g., software codes) that are configured to cause processor to perform various functions. The memory may include volatile and/or non-volatile memory. The memory may be removable, non-removable, or a combination thereof. Exemplary memories include solid-state memory, hard drives, optical-disc drives, and etc. The computer storage media stores information such as computer-readable instructions, data structures, program modules or other data. The computer-readable media can be any available media that can be accessed and include both volatile and non-volatile media, removable and non-removable media. By way of example, and not limitation, the computer-readable media may comprise computer storage media and communication media. The computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices.

FIG. 1 is a schematic diagram of a radio transmission model of a wireless communication system 100 according to an exemplary implementation of the present disclosure. The wireless communication system 100 includes a UE 110 and a base station (BS) 124. In the wireless communication system 100, the UE 110 transmits a signal which may be influenced by a mixer 112, an oscillator 113, a power amplifier (PA) 114 and an antenna 116 on the transmitter (TX) side, and then the BS 124 receives the signal which may be influenced by an antenna 118, a low-noise amplifier (LNA) 120, a mixer 122, and an oscillator 123 from the UE 110 on the receiver (RX) side. There is RF analog error caused by the RF components between TX and RX, e.g., the mixers 112 and 122, the oscillators 113 and 123, the PA 114, the LNA 120 and the antennas 116 and 118.

Three kinds of error model including a carrier frequency offset, a phase noise and Doppler shift caused by UE mobility are taken into account for the RF analog error. The carrier frequency offset between TX and RX is caused by separate reference clock oscillator's implementation (e.g., oscillators 113 and 123). The phase noise is generated by the local oscillators 113 and 123 (e.g., PLL implementation), which can be characterized by a low frequency region and a high frequency region. The phase noise of the low frequency region shows similar effect with the frequency offset error. Some advanced AFC (Automatic Frequency Controller) can compensate such errors. The phase noise of the high frequency region is different from the phase noise of the low frequency region. The coherence time of the high frequency region phase noise is shorter than that of the low frequency region phase noise and it depends on carrier frequency. The Doppler frequency or the Doppler spread depends on the carrier frequency, the UE mobility and an angle of arrival when beamforming is used. When the higher carrier frequency like millimeter wave is used, the coherence time of the Doppler shift, which has similar statistical characteristics (or similar value) to the coherence time of the high frequency region phase noise, is short. Long term behaviors of high frequency region phase noise and Doppler shift are different, e.g. in spectrum characteristics. In short time statistic, both have similar coherence time. Hence, the same reference signal configuration could be applied to compensate the RF analog error.

Figure 2:
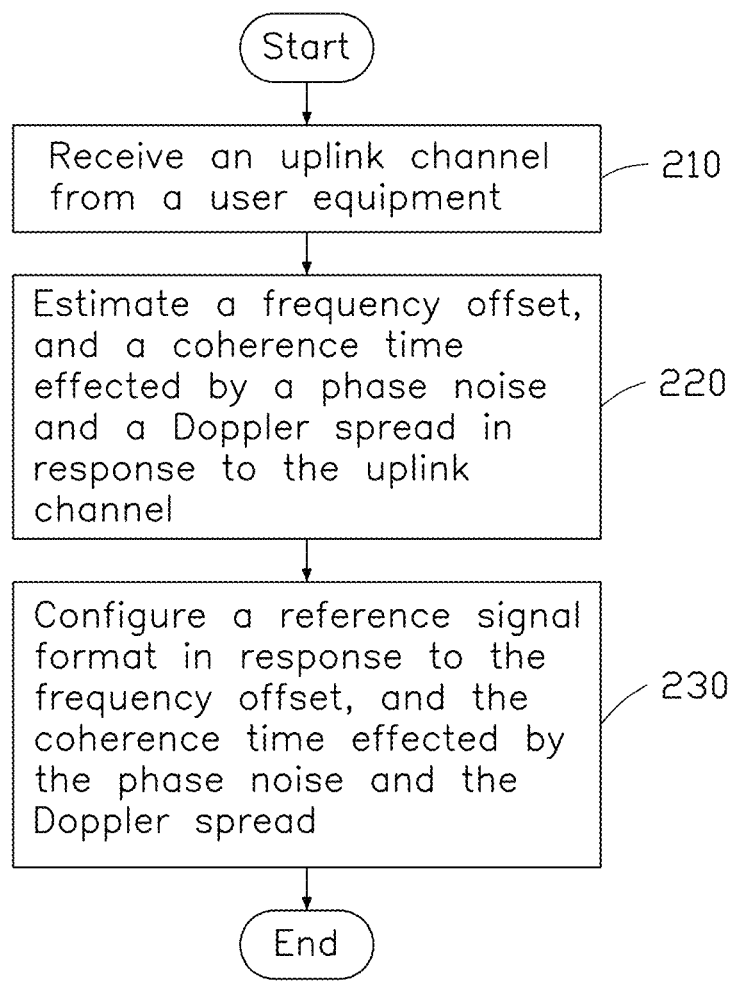
FIG. 2 is a flowchart of a method of reference signal configuration of a wireless communication system according to an exemplary implementation of the present disclosure.

FIG. 2 is a flowchart of a method 200 of reference signal configuration of a wireless communication system according to an exemplary implementation of the present disclosure. The method includes the following actions. In block 210, an uplink channel is received by a base station from a UE. In block 220, a frequency offset and a coherence time effected by a phase noise and a Doppler shift are estimated by the base station in response to the uplink channel. In block 230, a reference signal format is configured by the base station in response to the frequency offset and the coherence time effected by the phase noise and the Doppler shift.

In one implementation, the uplink channel is a physical random access channel (PRACH). In another implementation, the uplink channel is a physical uplink control channel (PUCCH).

In one implementation, the reference signal format includes a demodulation reference signal (DM-RS). In another implementation, the reference signal format includes a phase-tracking reference signal (PT-RS).

Figure 3:
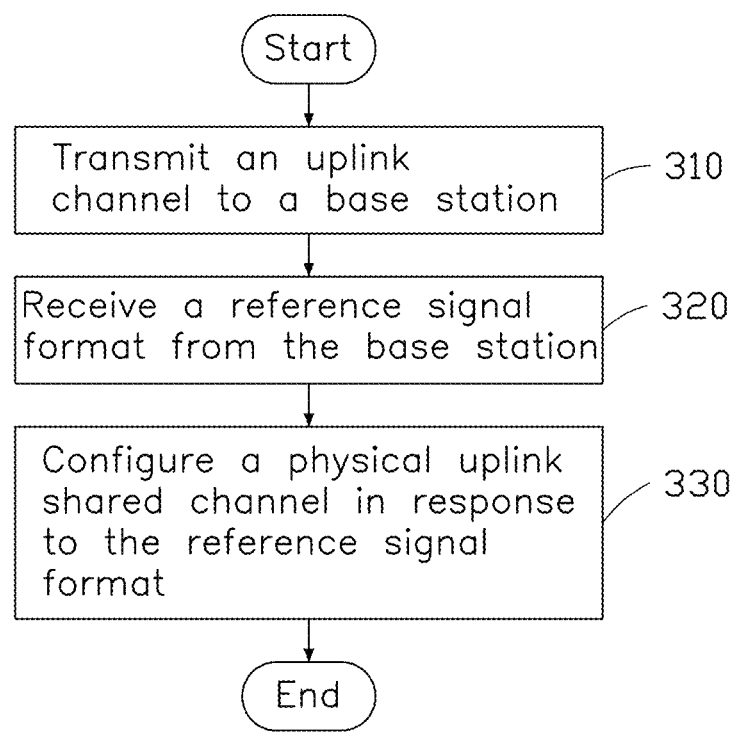
FIG. 3 is a flowchart of a method of reference signal configuration of a wireless communication system according to an exemplary implementation of the present disclosure.

FIG. 3 is a flowchart of a method 300 of reference signal configuration of a wireless communication system according to an exemplary implementation of the present disclosure. The method includes the following actions. In block 310, an uplink channel is transmitted by a UE to a base station. In block 320, a reference signal format is received by the UE from the base station. In block 330, a physical uplink shared channel is configured by the UE in response to the reference signal format.

Figure 4:
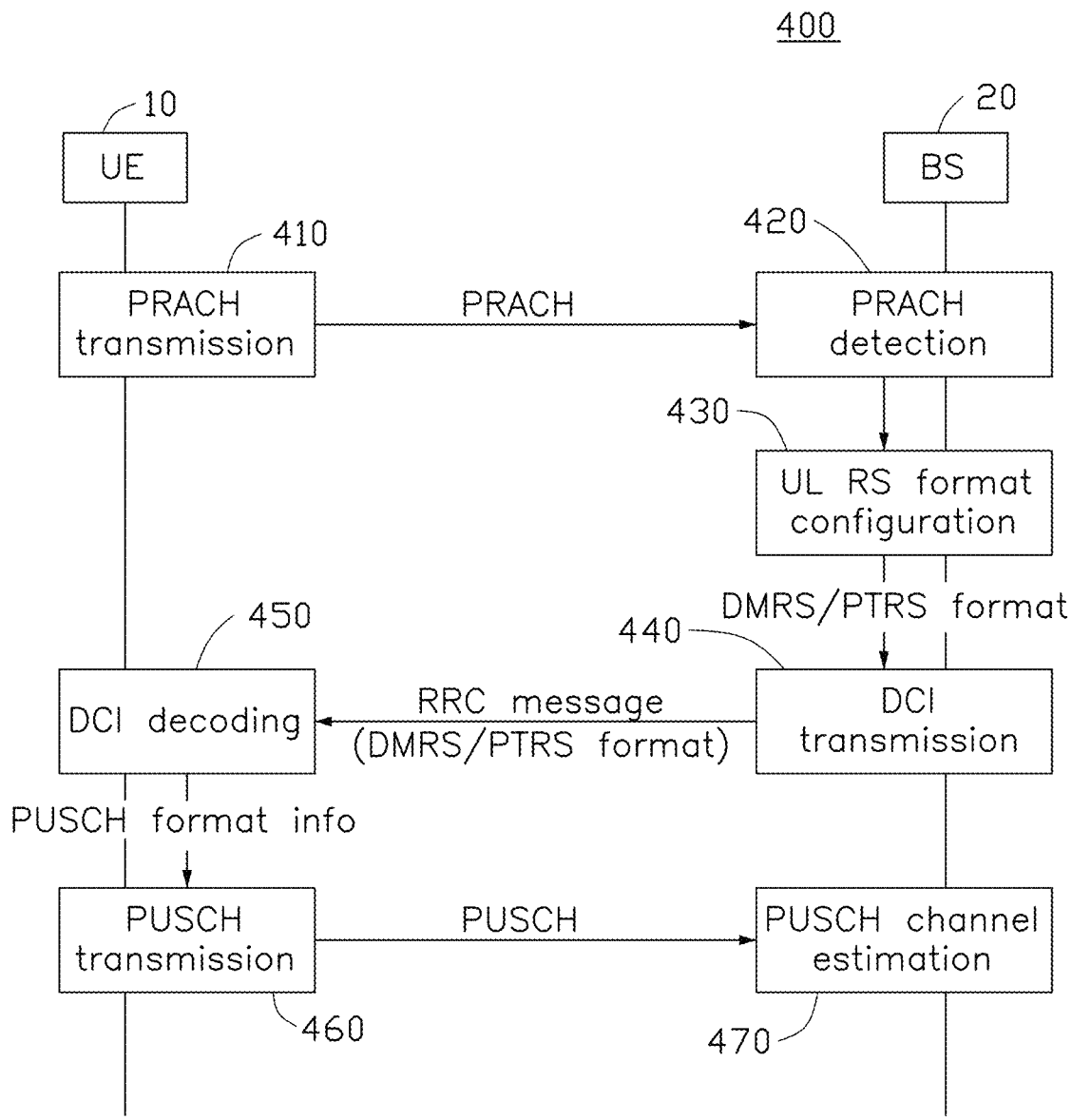
FIG. 4 is a schematic diagram of a method of reference signal configuration of a wireless communication system according to an exemplary implementation of the present disclosure.

FIG. 4 is a schematic diagram of a method 400 of reference signal configuration of a wireless communication system according to an exemplary implementation of the present disclosure. In this exemplary implementation, the wireless communication system includes a UE 10 and a base station (BS) 20. The uplink channel is a PRACH. In action 410, the UE 210 transmits a PRACH to the BS 20.

In action 420, the BS 20 receives the PRACH from the UE 10 and performs a PRACH detection to estimate a frequency offset, and a coherence time effected by the phase noise and the Doppler shift. In one implementation, the frequency offset includes a carrier frequency offset, a phase noise and Doppler spread.

In action 430, the BS 20 configures a reference signal format in response to the frequency offset and the coherence time. In one implementation, the reference signal format includes the DM-RS. In another implementation, the reference signal format includes the PT-RS. In some implementations, a time density of the reference signal (e.g., DM-RS or PT-RS) is configured. In some other implementations, a frequency density of the reference signal (e.g., DM-RS or PT-RS) is configured.

In action 440, the BS 20 transmits the reference signal format to the UE 10 via an Radio Resource Control (RRC) message (e.g., downlink control information (DCI) transmission).

In action 450, the UE 10 decodes the DCI and configures a physical uplink shared channel (PUSCH) in response to the received reference signal format.

In action 460, the UE 10 transmits the PUSCH to the BS 20.

In action 470, the BS 20 performs a PUSCH channel estimation in response to an uplink impulse response of the received PUSCH.

Figure 5:
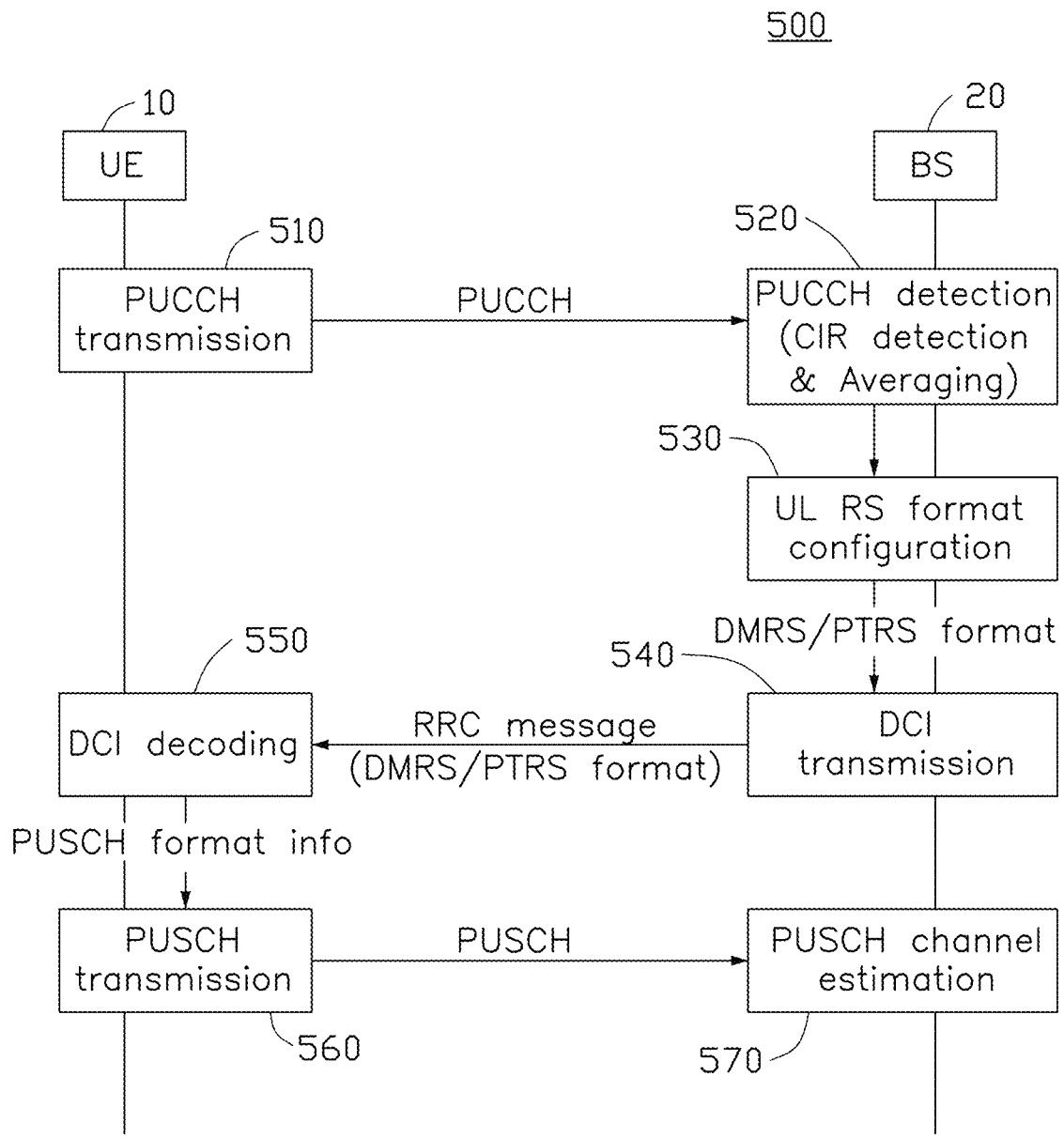
FIG. 5 is a schematic diagram of a method of reference signal configuration of a wireless communication system according to an exemplary implementation of the present disclosure.

FIG. 5 is a schematic diagram of a method 500 of reference signal configuration of a wireless communication system according to an exemplary implementation of the present disclosure. In this exemplary implementation, the wireless communication system includes a UE 10 and a base station (BS) 20. The uplink channel is a PUCCH. In action 510, the UE 210 transmits a PUCCH to the BS 20.

In action 520, the BS 20 receives the PUCCH from the UE 10 and performs a PUCCH detection (e.g., channel impulse response (CIR) detection & averaging) to estimate a frequency offset, and a coherence time effected by the phase noise and the Doppler shift. In one implementation, the frequency offset includes a carrier frequency offset, a phase noise and Doppler spread.

In action 530, the BS 20 configures a reference signal format in response to the frequency offset and the coherence time. In one implementation, the reference signal format includes the DM-RS. In another implementation, the reference signal format includes the PT-RS. In some implementations, a time density of the reference signal (e.g., DM-RS or PT-RS) is configured. In some other implementations, a frequency density of the reference signal (e.g., DM-RS or PT-RS) is configured.

In action 540, the BS 20 transmits the reference signal format to the UE 10 via an RRC message (e.g., downlink control information (DCI) transmission).

In action 550, the UE 10 decodes the DCI and configures a physical uplink shared channel (PUSCH) in response to the received reference signal format.

In action 560, the UE 10 transmits the PUSCH to the BS 20.

In action 570, the BS 20 performs a PUSCH channel estimation in response to an uplink impulse response of the received PUSCH.

Figure 6:
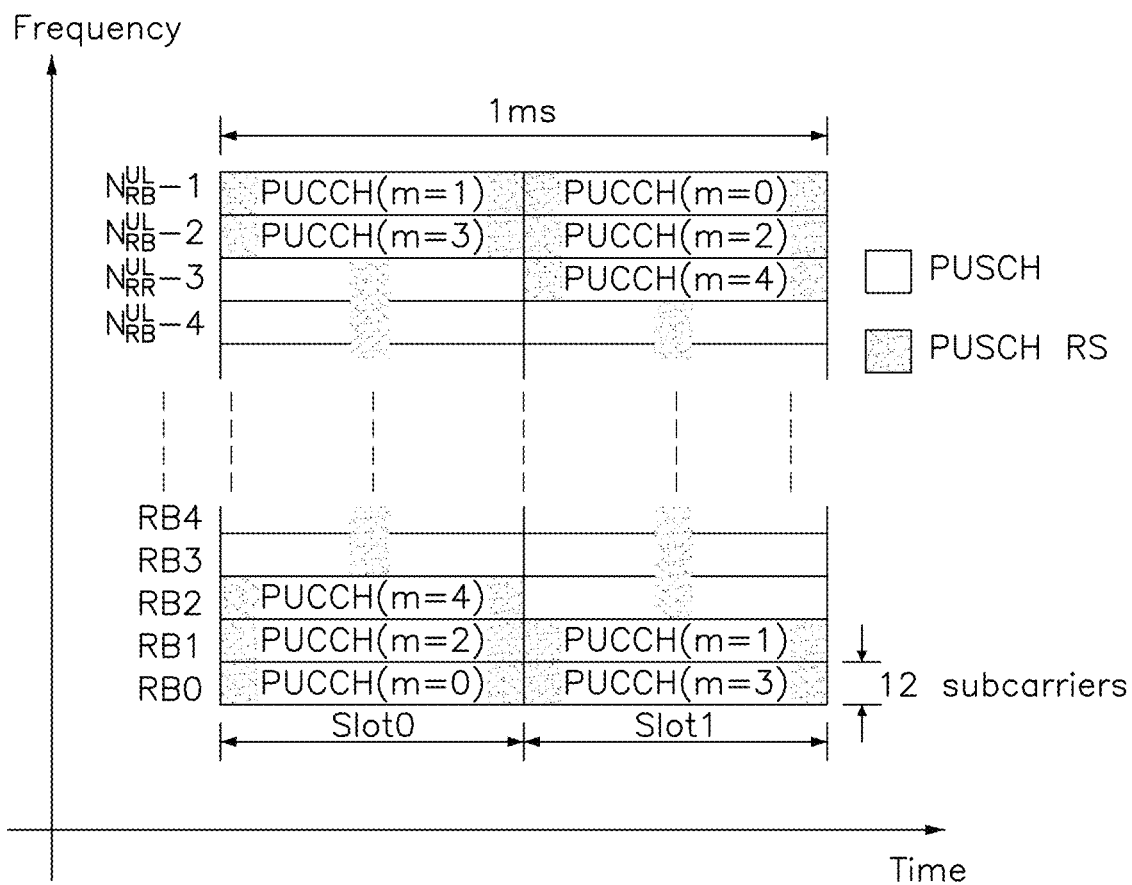
FIG. 6 is a schematic diagram of a resource allocation of a PUCCH format with a frequency hopping feature according to an exemplary implementation of the present disclosure.

FIG. 6 is a schematic diagram of a resource allocation of a PUCCH format with a frequency hopping feature according to an exemplary implementation of the present disclosure. As shown in FIG. 6, there are two slots in one subframe (e.g., 1 ms). The resources blocks (RBs) assigned for the PUCCH are located on the band edges of the channel bandwidth within the subframe, and the rest of the RBs are remained for the PUSCH. When the frequency hopping feature is used, a lower end of the available UL resources is used in the first slot of the subframe and a higher end is used in the second slot, and thus the level of frequency diversity is increased.

For example, a PUCCH (e.g., m=0) is transmitted at the lowest RB (e.g., RB0) in the first slot (e.g., Slot 0), and the same PUCCH (e.g., m=0) is retransmitted at the highest RB (e.g., $N_{RB}^{UL}-1$) in the second slot (e.g., Slot 1), where m is an index of the PUCCH resource, and the $N_{RB}^{UL}$ is the number of the uplink resource blocks. Another PUCCH (e.g., m=1) is transmitted at the highest RB (e.g., $N_{RB}^{UL}-1$) in the first slot (e.g., Slot 0), and the same PUCCH (e.g., m=0) is retransmitted at the lowest RB (e.g., RB0) in the second slot (e.g., Slot 1). The rest of the resources blocks for the PUCCH are allocated in a similar way. With increasing m, the allocated resource blocks move towards the center of the frequency band as shown in FIG. 6.

Figure 7:
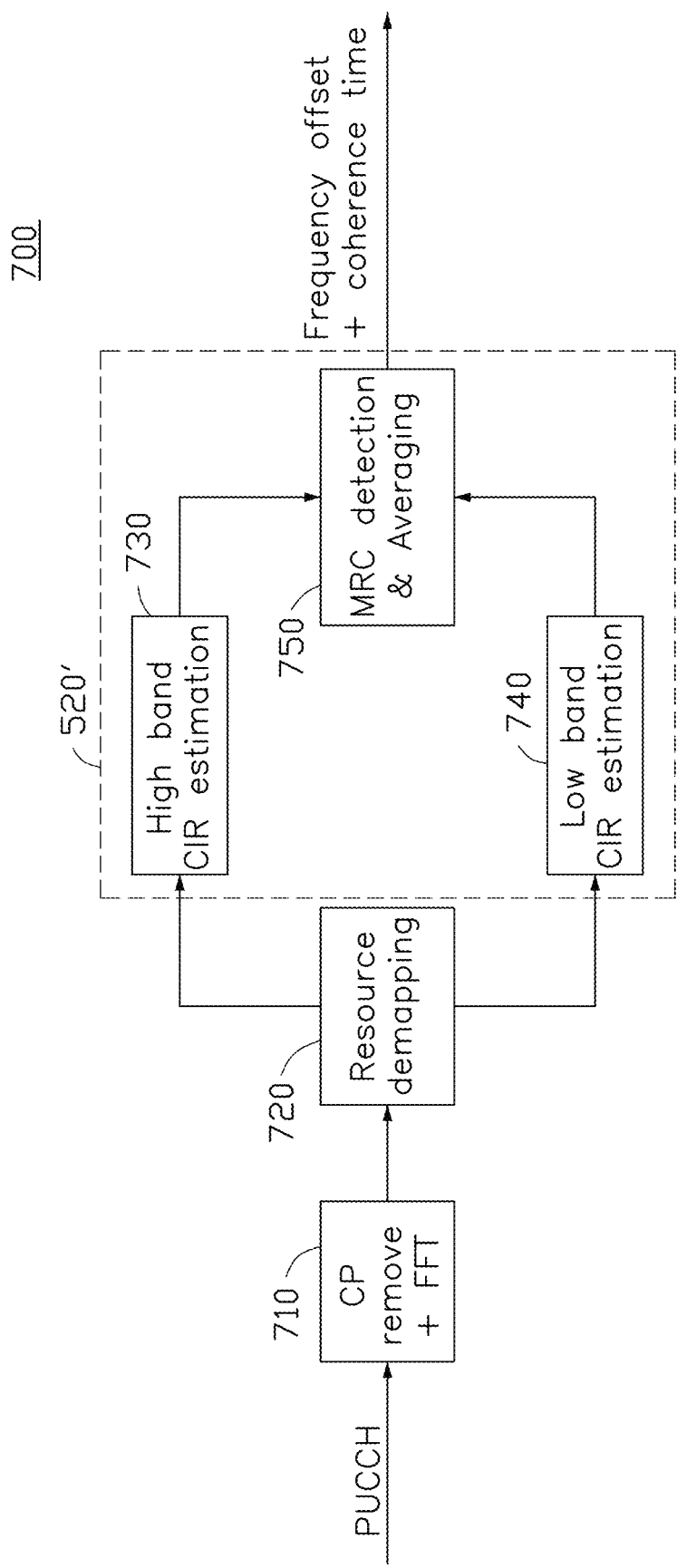
FIG. 7 is a schematic diagram of an implementation of the PUCCH detection according to an exemplary implementation of the present disclosure.

FIG. 7 is a schematic diagram 700 of an implementation of the PUCCH detection according to an exemplary implementation of the present disclosure. As shown in FIG. 7, in action 710, the Cyclic Prefixes (CPs) is removed and a fast Fourier transform is performed.

In action 720, a resource demapping is performed.

In action 520', a CIR detection & averaging is preformed to estimate a frequency offset. In one implementation, in order to achieve the frequency hopping feature, CIR is estimated individually for the higher band edge and for the lower band edge since the fast fading channel is independent. Also, the instantaneous channel quality or signal strength (e.g., signal-to-interference-plus-noise ratio (SINR)) at the band edges could be effected by the fast fading fluctuation, and therefore a maximum ratio combining (MRC) detection and averaging is performed for the higher band edge and the lower band edge.

For example, in action 730, a CIR estimation is performed on the higher band edge to generate a first frequency offset. In action 740, a CIR estimation is performed on the lower band edge to generate a second frequency offset. In action 750, a MRC detection and averaging is performed on the first frequency offset and the second frequency offset to generate the estimated frequency offset. In one implementation, the frequency offset includes a carrier frequency offset, a phase noise and Doppler spread.

Figure 8:
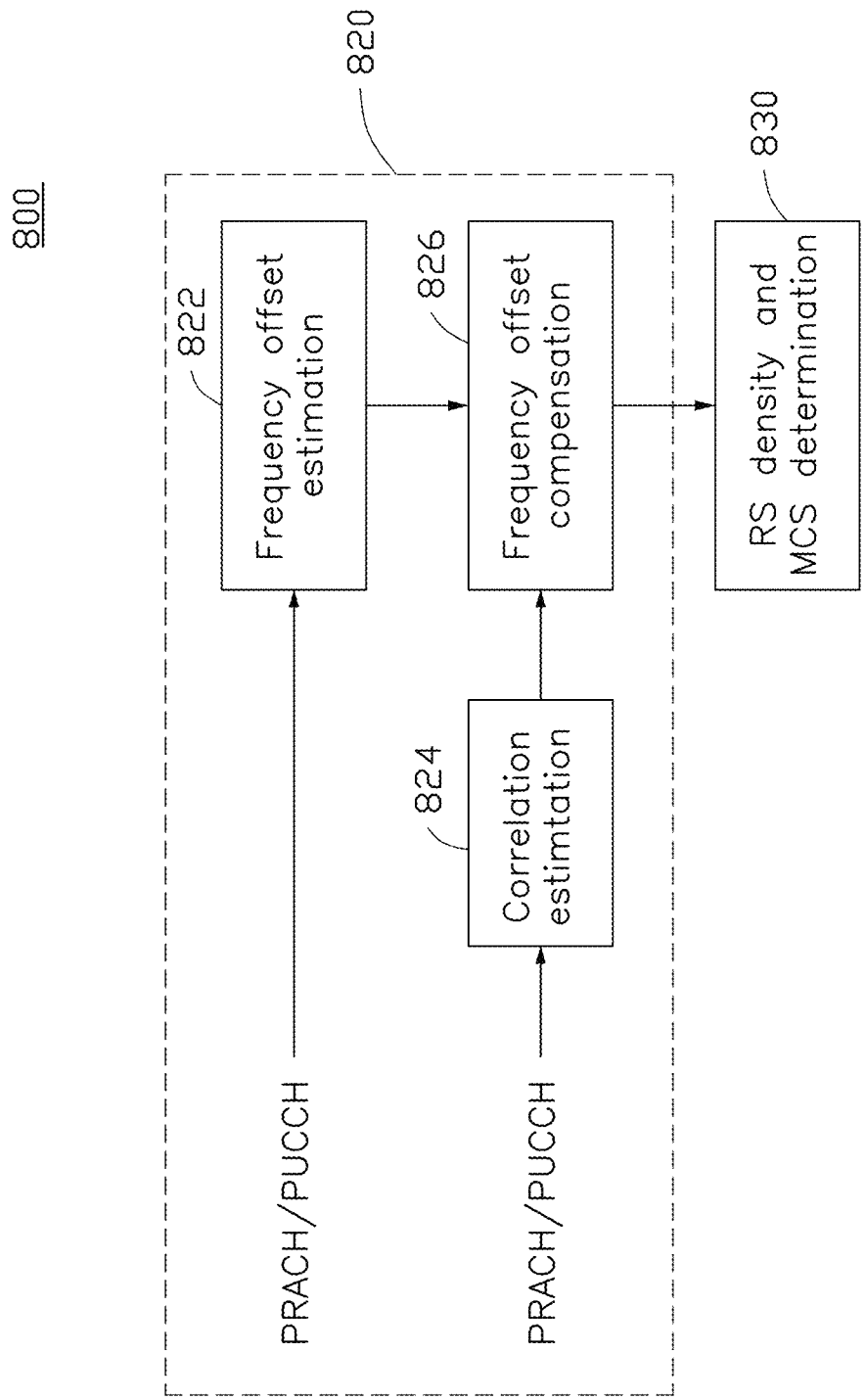
FIG. 8 is a schematic diagram of an implementation of a reference signal configuration according to an exemplary implementation of the present disclosure.

FIG. 8 is a schematic diagram 800 of an implementation of a reference signal configuration according to an exemplary implementation of the present disclosure. In this implementation, the method may be applied for a PRACH or a PUCCH detection. As shown in FIG. 8, in action 820, the BS performs a PRACH detection or a PUCCH detection to estimate a frequency offset and a coherence time effected by the phase noise and the Doppler shift.

In action 822, the frequency offset is estimated. In one implementation, when a PRACH is received, a signature detection process is performed on two sequences of the PRACH for estimating the carrier frequency offset. In another implementation, when a PUCCH is received, the carrier frequency offset is estimated based on the cyclic prefix of OFDM signal 113.

In action 824, a correlation estimation which estimates a correlation level corresponding to the coherence time is performed. In one implementation, when a PRACH is received, a signature detection process is performed on two sequences of the PRACH and then the complex signal peak position is detected for the two sequences. Afterwards, the correlation level between the two complex signals is calculated. For example, a correlation level corresponding to the coherence time is calculated by: $R_c(\Delta T_c)=E[x(t)\cdot x^*(t-\Delta T_c)]$, where $x(t)$ is the received PRACH signature at time t, $x(t-T_c)$ is the received PRACH signature at time $t-T_c$, $T_c$ is a measurement interval, and * is complex conjugate.

In another implementation, when a PUCCH is received, the two DM-RS from two slots are received for estimating the channel (e.g., CIR). The estimated channel coefficients from the two slots are used for calculating the correlation (e.g., coherence time).

After the correlation is estimated, the estimated correlation includes a phase noise correlation, a Doppler spread and the frequency offset. In action 826, the frequency offset (e.g., $\cos(2\pi \cdot f_o \cdot T_c)$) is compensated or removed, for example, the correlation result after the compensation $R_{c,\,no\,offset}(T_c)$ is represented by: $R_{c,no\,offset}(\Delta T_c)=R_c(\Delta T_c)-a\cdot\cos(2\pi \cdot f_o \cdot \Delta T_c)$, where $T_c$ is a measurement interval, $f_o$ is the frequency offset, and a is a coefficient for amplitude adjustment.

In action 830, the reference signal (RS) density and the MCS are determined in response to the estimated correlation level after the frequency offset compensation. Table 1 shows a time density configuration of the PT-RS, where ptrs-$MCS_i$ are the threshold values, and i=1, 2, 3. Table 2 shows a frequency density configuration of the PT-RS, where $N_{RBi}$ are the threshold values, and i=0, 1.

TABLE 1

| Scheduled MCS | Time density ($L_{PT-RS}$) |
| --- | --- |
| $I_{MCS}$ < ptrs-$MCS_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

TABLE 2

| Scheduled bandwidth | Frequency density ($K_{PT-RS}$) |
| --- | --- |
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In one implementation, the channel estimation may compensate the degradations caused by the Doppler shift and the phase noise if the density of the reference signal is enough to reproduce the Doppler shift and the phase noise. On the other hand, high density of the reference signal increases the redundancy of the uplink transmission. The appropriate density should be selected based on the actual Doppler shift and the phase noise.

In this implementation, the time density threshold values (e.g., ptrs-$MCS_i$) or the frequency density values (e.g., $N_{RBi}$) may be adjusted in response to the coherence time effected by the phase noise and the Doppler shift (after the frequency offset compensation). For example, when the correlation level (after the frequency offset compensation) corresponding to the coherence time (e.g., $R_{c,no\,offset}(\Delta T_c)$) is greater than or equal to a threshold, which means that the channel variation is slow, a higher MCS is assigned and a lower density is configured, and thus only the DM-RS is used. Alternatively, when the correlation level corresponding to the coherence time is less than the threshold, which means that the channel variation is fast, a lower MCS is assigned and a higher density is configured, and thus one or more PT-RS is used.

Figure 9:
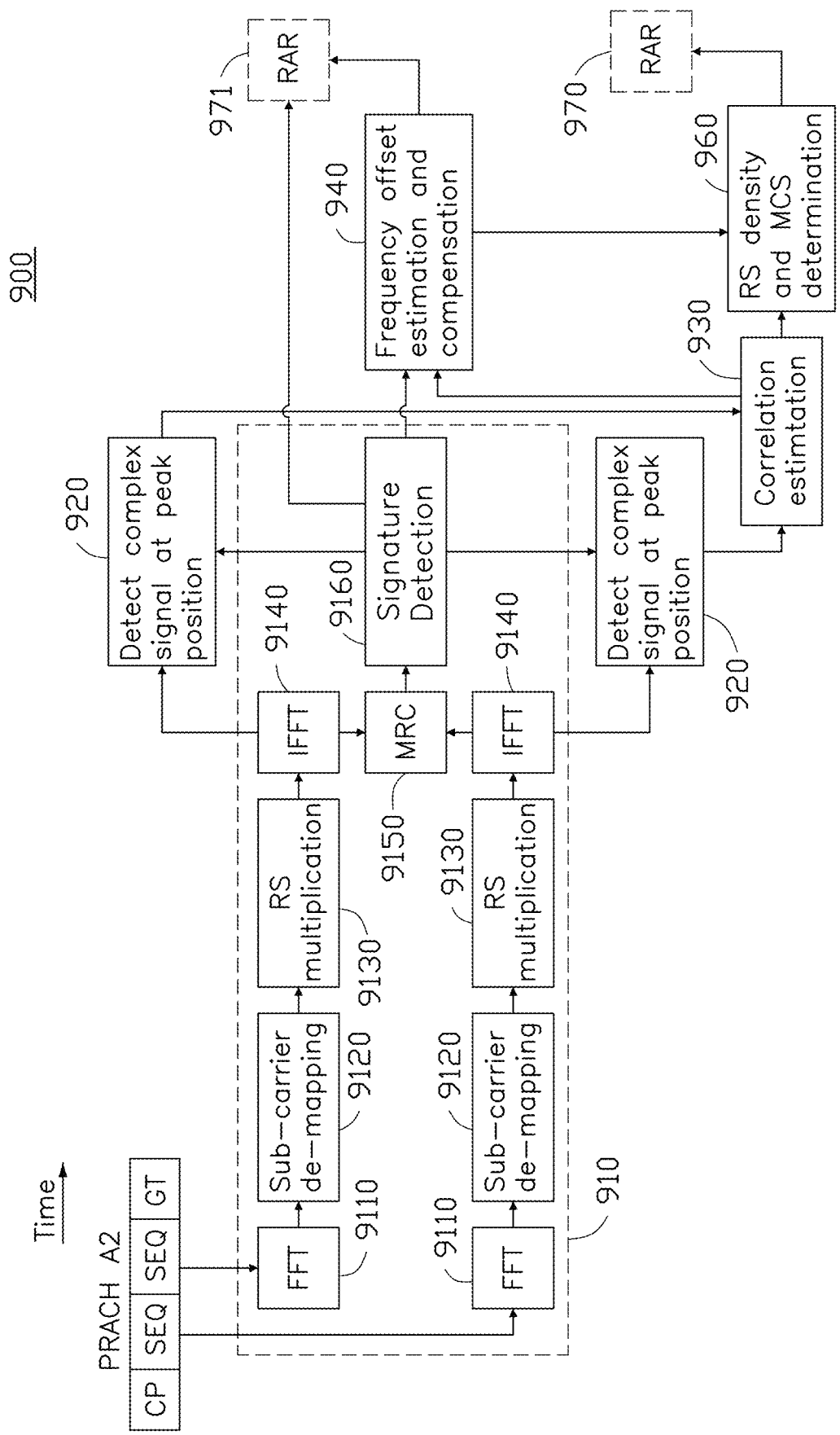
FIG. 9 is a schematic diagram of an implementation of a reference signal configuration according to an exemplary implementation of the present disclosure.

FIG. 9 is a schematic diagram 900 of an implementation of a reference signal configuration according to an exemplary implementation of the present disclosure. In this implementation, a PRACH is applied. In a 5G NR wireless communication system, a base station may continuously receive the same PRACH sequence for multiple times. The number of times receiving the PRACH sequence(s) can be specified by the format type. For example, the minimum repetition format is 2 in PRACH A2. In the present implementation, a PRACH A2 format is used.

As shown in FIG. 9, the schematic diagram 900 includes blocks 910, 920, 940, 950, 960, 970 and 971. In block 910, the base station may receive multiple uplink sequences (e.g., a first PRACH sequence and a second PRACH sequence) from an uplink channel (e.g., PRACH). It is noted that although in FIG. 9 only two uplink sequences are received and processed, the present disclosure is not limited thereto. In some implementations, the number of unlink sequences received and processed by the base station can be up to 12. In another implementation, the uplink channel may be a Physical Uplink Control Channel (PUCCH) or a Physical Uplink Shared Channel (PUSCH).

The block 910 may include a fast Fourier transform (FFT) procedure 9110, a sub-carrier de-mapping procedure 9120, a reference signal multiplication procedure 9130 and an inverse fast Fourier transform (IFFT) procedure 9140. The procedures 9110, 9120, 9130 and 9140 may have a function similar to that of the LTE PRACH signature detection process, and can be replaced by other signal detection hardware and/or software implementations.

The block 910 may further include a Maximum Ratio Combining (MRC) procedure 9150 and a signature detection procedure 9160. The MRC procedure 9150 may output of a combined result of the received uplink sequences. The signature detection procedure 9160 may determine channel signature information based on the combined result. In one implementation, the channel signature information may include a power delay profile. In one implementation, the channel signature information can be provided to the RAR procedure 971 for providing an RAR to the UE.

In some implementations, the MRC procedure 9150 can by replaced by other optimal combining procedure(s). In one implementation, the MRC procedure 9150 can be replaced by a coherent accumulation procedure.

In block 920, the base station may detect multiple complex signals at peak positions from the uplink sequences based on the channel signature information. In one implementation, the base station may estimate the peak position in the block 910, too.

Furthermore, in block 920, the base station may output multiple complex signals located at the peak positions in the power delay profile. As shown in FIG. 9, two complex signals may be outputted from the two blocks 920, respectively, where one is for the first PRACH sequence and the other is for the second PRACH sequence.

In block 950, the base station may estimate a correlation level based on the complex signals. The correlation level may reflect the coherence time of the received signal. For example, a lower correlation level may correspond to a shorter coherence time.

In one implementation, in block 950, the base station may calculate the correlation level between the complex signal of the first PRACH sequence and the complex signal of the second PRACH sequence. For example, a correlation level corresponding to the coherence time can be calculated by: $R_c(\Delta T_c)=E[x(t)\cdot x^*(t-\Delta T_c)]$, where $x(t)$ is the received PRACH signature at time t, $x(t-T_c)$ is the received PRACH signature at time $t-T_c$, $T_c$ is a measurement interval, and * is complex conjugate.

In block 940, the base station may estimate a frequency offset based on the channel signature information (e.g., the power delay profile), and compensate (or remove) the estimated frequency offset (e.g., $\cos(2\pi \cdot f_o \cdot T_c)$) based on the channel signature information. In one implementation, the base station may determine multiple power peak levels from the received uplink sequences based on the power delay profile, and estimate the frequency offset based on the power peak levels. For example, based on the power delay profile, the base station may estimate the frequency offset by comparing the first peak level of power delay profile corresponding to the first PRACH sequence and the second peak level of power delay profile corresponding to the second PRACH sequence.

The estimated correlation level may include a phase noise correlation, a Doppler spread and the frequency offset. The frequency offset may cause the bias of the estimated correlation level.

The output of block 950 can be further used for the RS density and the MCS determination procedure (block 960). The correlation level after the compensation $R_{c,\,no\,offset}(T_c)$ can be represented by: $R_{c,no\,offset}(\Delta T_c) = R_c(\Delta T_c) - a \cdot \cos(2\pi \cdot f_o \cdot \Delta T_c)$ where $T_c$ is a measurement interval, $f_o$ is the frequency offset, and a is a coefficient for amplitude adjustment.

In block 960, the base station may determine a density of a reference signal and a Modulation and Coding Scheme (MCS) based on the correlation level. For example, the reference signal may be the DM-RS or the PT-RS.

In one implementation, the base station may perform an RS density & MCS determination procedure to determine the appropriate RS density set and MCS, and output the results to the random access response (RAR) procedure (e.g., block 970). The RAR procedure may assign the determined RS density and MCS for the uplink transmission.

Figure 10:
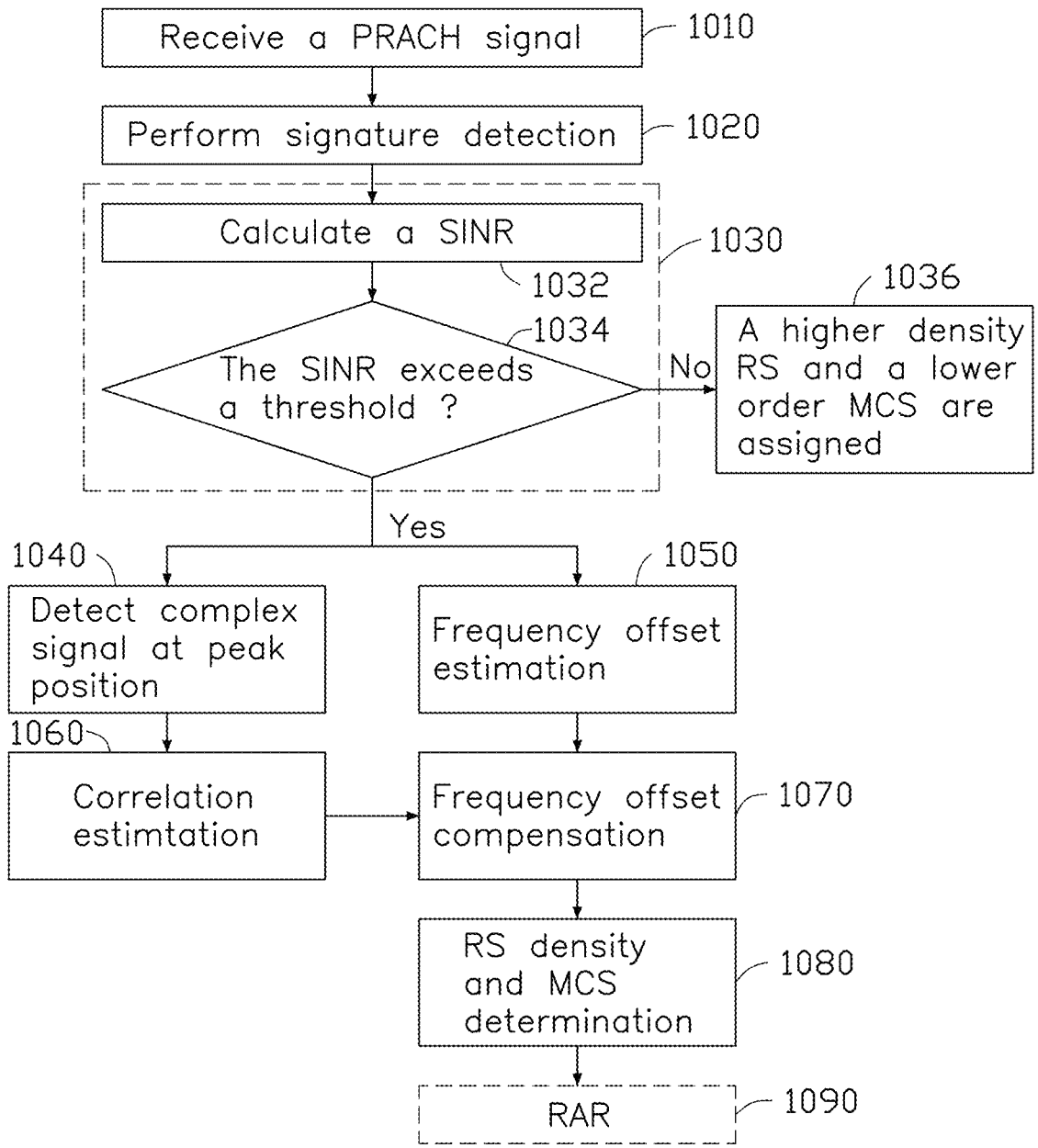
FIG. 10 is a flowchart of a method of a reference signal configuration according to an exemplary implementation of the present disclosure.

FIG. 10 is a flowchart of a method 1000 of a reference signal configuration according to an exemplary implementation of the present disclosure. The method includes the following actions. In action 1010, a PRACH signature is received. In action 1020, a signal detection process is performed. The signal detection process may be used for the RAR e procedure. In action 1030, a channel quality is estimated. In this implementation, the decision process detecting the received SINR and determining whether the received SINR satisfies the threshold level for the time correlation estimation is introduced in the determination flow. For example, in action 1032, a SINR is calculated. In action 1034, whether the SINR exceeds a threshold is determined. When the SINR does not exceed the threshold, a higher density RS and a lower MCS are assigned in action 1036.

When the SINR exceeds the threshold, multiple complex signals are detected at the peak position in action 1040, and the frequency offset is estimated in action 1050. After the complex signals are detected at the peak position, the correlation level between the detected complex signals is estimated in action 1060. On the other hand, after the frequency offset is estimated and the correlation level between the detected complex signals are estimated, the estimated frequency offset can then be compensated (or removed) in action 1070. Afterwards, the RS density & MCS determination are determined in action 1080. And then, the RS configuration is outputted to the RAR procedure in action 1090.

Generally, the estimation result of the correlation estimation is worse under a lower SINR because the interference and the noise causes the un-necessary bias of the estimation result. Therefore, under a lower SINR environment, despite the estimation result, a lower order MCS would be selected in order to improve the BLER performance, and a higher density of reference signal would be selected to improve the channel estimation performance.

Figure 11:
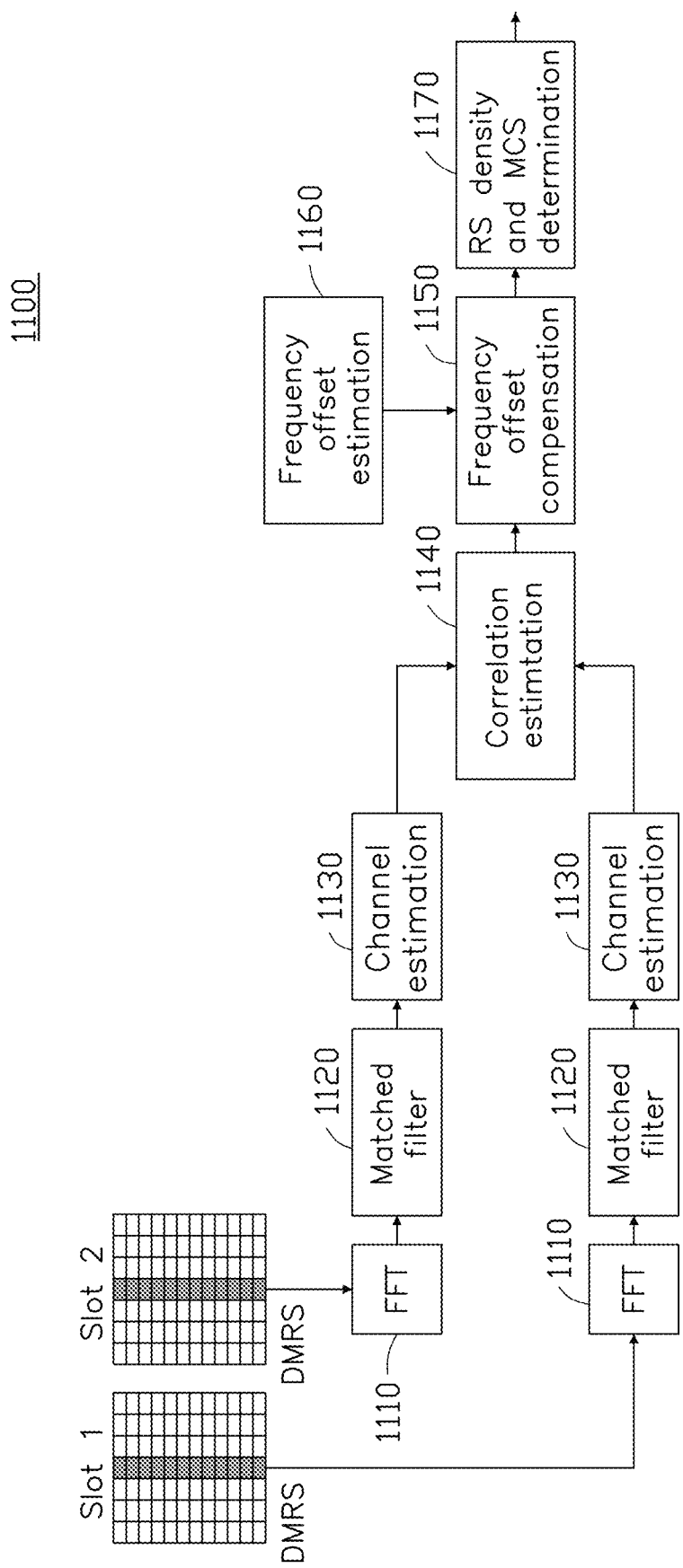
FIG. 11 is a schematic diagram of an implementation of a reference signal configuration according to an exemplary implementation of the present disclosure.

FIG. 11 is a schematic diagram 1100 of an implementation of a reference signal configuration according to an exemplary implementation of the present disclosure. In this implementation, the DM-RS of a PUCCH is applied. In block 1110, a FFT procedure is performed on slot 1 and slot 2 of the DM-RS of the PUCCH, respectively.

After the FFT procedure, the output signals are inputted to the matched filter. In block 1120, the matched filter generates the estimated channel impulse response. In block 1130, a channel estimation procedure is performed to generate the estimated channel coefficients from slot 1 and slot 2.

In block 1140, a correlation estimation is performed to output the time correlation between slot 1 and slot 2 is calculated. The time correlation between slot 1 and slot 2 includes a frequency offset. Therefore, in block 1150, a frequency offset compensation procedure is performed to compensate the frequency offset. The frequency offset is estimated by the frequency offset estimation procedure as shown in block 1160 according to the correlation of cyclic prefix of OFDM symbols.

After the frequency offset compensation, a RS density & MCS are determined and the selected RS density and MCS for the uplink transmission are assigned in block 1170.

Based on the above, several methods for power saving for the UE and wireless communications are provided in this disclosure. The implementations shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method comprising:
   receiving, by a base station, a plurality of uplink sequences from an uplink channel;
   performing, by the base station, an optimal combining procedure on the plurality of uplink sequences to output a combined result of the plurality of uplink sequences;
   determining, by the base station, channel signature information based on the combined result;
   detecting, by the base station, a plurality of complex signals at peak positions from the plurality of uplink sequences based on the channel signature information;
   estimating, by the base station, a correlation level based on the plurality of complex signals; and
   determining a density of a reference signal and a Modulation and Coding Scheme based on the correlation level;
   wherein the channel signature information comprises a power delay profile.

2. The method of claim 1, wherein the uplink channel is a Physical Random Access Channel (PRACH).

3. The method of claim 2, wherein the uplink sequences for the PRACH are PRACH sequences.

4. The method of claim 1, wherein the uplink channel is a Physical Uplink Control Channel (PUCCH) or a Physical Uplink Shared Channel (PUSCH).

5. The method of claim 4, wherein the uplink sequences for the PUCCH or the PUSCH are Demodulation Reference Signals (DM-RSs).

6. The method of claim 1, wherein optimal combining procedure is a Maximum Ratio Combining (MRC) procedure.

7. The method of claim 1, further comprising: determining, by the base station, a plurality of power peak levels from the plurality of uplink sequences based on the power delay profile; and estimating, by the base station, a frequency offset based on the plurality of power peak levels.

8. The method of claim 7, further comprising: compensating, by the based station, the frequency offset based on the channel signature information.

9. The method of claim 1, wherein the reference signal is a Demodulation Reference Signal (DM-RS) or a Phase Tracking Reference Signal (PT-RS).

10. A base station, comprising:
one or more non-transitory computer-readable media having computer-executable instructions embodied thereon; and
at least one processor coupled to the one or more non-transitory computer-readable media, and configured to execute the computer-executable instructions to:
receive a plurality of uplink sequences from an uplink channel;
perform an optimal combining procedure on the plurality of uplink sequences to output a combined result of the plurality of uplink sequences;
determine channel signature information based on the combined result;
detect a plurality of complex signals at peak positions from the plurality of uplink sequences based on the channel signature information;
estimate a correlation level based on the plurality of complex signals; and
determine a density of a reference signal and a Modulation and Coding Scheme based on the correlation level;
wherein the channel signature information comprises a power delay profile.

11. The base station of claim 10, wherein the uplink channel is a Physical Random Access Channel (PRACH).

12. The base station of claim 11, wherein the uplink sequences for the PRACH are PRACH sequences.

13. The base station of claim 10, wherein the uplink channel is a Physical Uplink Control Channel (PUCCH) or a Physical Uplink Shared Channel (PUSCH).

14. The base station of claim 13, wherein the uplink sequences for the PUCCH or the PUSCH are Demodulation Reference Signals (DM-RSs).

15. The base station of claim 10, wherein optimal combining procedure is a Maximum Ratio Combining (MRC) procedure.

16. The base station of claim 10, wherein the at least one processor is further configured to execute the computer-executable instructions to: determine a plurality of power peak levels from the plurality of uplink sequences based on the power delay profile; and estimate a frequency offset based on the plurality of power peak levels.

17. The base station of claim 16, wherein the at least one processor is further configured to execute the computer-executable instructions to: compensate the frequency offset based on the channel signature information.

18. The base station of claim 10, wherein the reference signal is a Demodulation Reference Signal (DM-RS) or a Phase Tracking Reference Signal (PT-RS).

* * * * *